United States Patent
Feng et al.

(10) Patent No.: US 6,596,411 B2
(45) Date of Patent: Jul. 22, 2003

(54) HIGH ENERGY BEAM WELDING OF SINGLE-CRYSTAL SUPERALLOYS AND ASSEMBLIES FORMED THEREBY

(75) Inventors: Ganjiang Feng, Clifton Park, NY (US); Daniel Anthony Nowak, Alplaus, NY (US)

(73) Assignee: General Electric Company, Schenectady, NY (US)

(*) Notice: Subject to any disclaimer, the term of this patent is extended or adjusted under 35 U.S.C. 154(b) by 32 days.

(21) Appl. No.: 10/010,130

(22) Filed: Dec. 6, 2001

(65) Prior Publication Data

US 2003/0108767 A1 Jun. 12, 2003

(51) Int. Cl.[7] ................................................. B23K 15/00
(52) U.S. Cl. ........................ 428/637; 428/678; 428/680; 219/121.14
(58) Field of Search ................................. 428/680, 678, 428/679, 637, 638, 615, 685; 219/121.12, 121.13, 121.14, 121.35

(56) References Cited

U.S. PATENT DOCUMENTS

| | | | | |
|---|---|---|---|---|
| 3,456,092 A | * | 7/1969 | Rush | 219/121.12 |
| 3,617,685 A | * | 11/1971 | Brill-Edwards et al. | 219/121.14 |
| 4,263,496 A | | 4/1981 | Medlar | 219/121.14 |
| 4,288,677 A | * | 9/1981 | Sakata et al. | 219/121.14 |
| 4,492,846 A | * | 1/1985 | Hara et al. | 219/121.63 |
| 4,900,394 A | * | 2/1990 | Mankins | 117/10 |
| 5,554,837 A | * | 9/1996 | Goodwater et al. | 219/121.63 |
| 5,897,801 A | * | 4/1999 | Smashey et al. | 219/137 WM |
| 6,489,583 B1 | * | 12/2002 | Feng et al. | 219/121.14 |

FOREIGN PATENT DOCUMENTS

| | | | |
|---|---|---|---|
| DE | 2130127 | * | 12/1972 |
| DE | 2130128 | * | 12/1972 |
| JP | 54-031050 | * | 3/1979 |
| JP | 63-097802 | * | 4/1988 |
| JP | 05-023920 | * | 2/1993 |
| WO | WO 96/22854 | * | 8/1996 |

OTHER PUBLICATIONS

Derwent abstract for SU 1771147 A1, published Mar. 20, 1996, two pages.*
U.S. patent application disclosure Ser. No. 09/638,072 to Feng, et al., filed Aug. 11, 2000, 9 total pages.

* cited by examiner

*Primary Examiner*—John J. Zimmerman
(74) *Attorney, Agent, or Firm*—Ernest Cusick; Gary M. Hartman; Domenica N. S. Hartman

(57) ABSTRACT

A method of welding articles formed of single-crystal superalloys, particularly single-crystal nickel-base superalloys containing 10 weight percent or more of refractory metals, and welded assemblies formed thereby. A shim is positioned between the articles, and a backing strip is preferably positioned to contact both articles and bridge the gap between the articles. The articles are then welded together using a high energy beam with a low current pulse frequency and low travel speed.

35 Claims, 2 Drawing Sheets

HIGH ENERGY BEAM WELDING OF SINGLE-CRYSTAL SUPERALLOYS AND ASSEMBLIES FORMED THEREBY

CROSS REFERENCE TO RELATED APPLICATIONS

Not applicable.

STATEMENT REGARDING FEDERALLY SPONSORED RESEARCH

Not applicable.

BACKGROUND OF THE INVENTION (1) Field of the Invention

The present invention generally relates to welding methods for superalloys. More particularly, this invention is directed to a method for electron beam welding single-crystal nickel-base superalloys containing significant amounts of refractory elements, by which the incidence of cracking is reduced in the resulting welded assembly.

(2) Description of the Related Art

Nickel-base superalloys are widely used to form components of gas turbine engines, including combustors and turbine vanes and blades. Superalloy components are often formed by casting, and for some applications are preferably or necessarily fabricated by welding as a result of their complexity. Welding is also widely used as a method for restoring blade tips, and for repairing cracks and other surface discontinuities in superalloy components caused by thermal cycling or foreign object impact.

Structural welds of nickel-base superalloy castings containing gamma-prime (Y') precipitates, and particularly those containing significant amounts of refractory elements such as tantalum, aluminum, molybdenum, tungsten, rhenium and niobium (columbium), are known to form strain age cracks upon cooling from welding or upon subsequent reheating, such as during aging when the gamma prime phase is reprecipitated following solution heat treatment. As an example, the single-crystal nickel-base superalloy known as René N5, containing greater than 10 weight percent refractory elements, has been generally viewed as unweldable. The cause of cracks in superalloys such as René N5 is due at least in part to the residual stress produced during the welding and aging cycles.

Low heat input welding processes, such as laser or electron beam (EB) welding (collectively referred to herein as high energy beam welding) have been used to produce crack-free weld joints in single-crystal superalloys over a narrow range of welding conditions. An advantage of EB welding processes is that the high energy density of the focused electron beam is able to produce deep, narrow welds at high speed, making possible the formation of structural butt welds that add minimal additional weight. However, a drawback observed with laser beam and EB welding processes is directional grain growth in the fusion zone, which forms a distinct dendritic boundary in the center of the weld zone. This type of grain structure makes the joint vulnerable to centerline cracking, which reduces the fatigue strength of the welded component. Another problem encountered when high energy beam welding single-crystal superalloys is associated with the use of single-crystal backing strips beneath the abutting ends of a butt weld. Both of these defects are represented in FIG. 1, which shows a welded assembly 10 comprising a pair of superalloy components 12 and 14 and a backing strip 16, in which the components 12 and 14 are joined by a butt weld joint 18. A centerline crack 20 is represented as being present in the joint 18, while a root crack 22 is shown in the backing strip 14.

High temperature TIG (tungsten inert gas) welding processes have been developed to overcome the centerline cracking problem associated with single-crystal superalloy joints formed by high energy beam welding. However, joint thickness and dimensions are limited by TIG processes, and their use is limited by the requirement for restrictive control of temperature, atmosphere and process parameters in order to produce a uniform grain structure for acceptable fatigue properties. Even then, there is the risk of excessive distortion and heat-affected zone (HAZ) cracking.

In U.S. Pat. No. 6,489,583 to Feng et al., EB welding is used in combination with a superalloy shim to form weld joints in single-crystal superalloys. Using a narrow range of welding conditions, the welding process disclosed by Feng et al. is able to avoid the formation of centerline cracks encountered by previous high energy beam welding processes. However, the high energy beam welding process disclosed by Feng et al. has not eliminated the development of root cracks where both components being welded are single-crystal superalloys, and particularly where the superalloys contain relatively high levels of refractory elements, as in the case of René N5.

In view of the difficulties discussed above, single-crystal superalloy assemblies have most often been formed from superalloys that are less prone to cracking, or assembled with fasteners or by brazing. However, the use of fasteners requires flanges and brazing typically requires a large interface (faying surface), both of which result in increased weight. Therefore, it would be desirable if a welding process existed for joining single-crystal nickel-base superalloys, particularly those containing 10 weight percent or more of refractory metals, and which was capable of producing a crack-free joint that exhibits improved fatigue life at high temperatures and strains.

BRIEF SUMMARY OF THE INVENTION

The present invention generally provides a method for welding components formed of nickel-base superalloys, particularly single-crystal superalloys containing 10 weight percent or more of refractory metals, and to the resulting welded assemblies. The method of this invention reduces the incidence of cracking through the use of a high energy beam welding process that makes use of a shim and particular welding parameters to develop a defect-free joint that exhibits improved fatigue life at high temperatures and high strain ranges.

The method of this invention involves high energy beam welding single-crystal nickel-base superalloy articles, with the above-noted shim placed in a gap between the articles so that the shim contacts the faying surfaces of the articles. A backing strip may be present that contacts both articles and bridges the gap between the articles. According to one aspect of the invention, the shim may be formed of a nickel-base superalloy that is more ductile than the nickel-base superalloys of the articles. The articles are welded together using a high energy beam with a current pulse frequency of about 10 to 50 Hz and a travel speed of about 0.85 to about 1.5 cm/s. The high energy beam causes the shim and portions of the articles contacting the shim to melt, and the superalloys of the shim and articles to mix. According to the invention, the frequency and speed parameters of the welding process cause the resulting weld joint to form multiple roots that extend into the backing strip (if present).

A preferred aspect of the invention is the elimination of both centerline and root cracks in the weld joint and, in the case of a buft weld, full penetration of the weld joint. Other advantages of the invention include reducing part distortion and a simplified process in the production of superalloy joints for complex structures, including airfoils for gas turbine engine applications.

Other objects and advantages of this invention will be better appreciated from the following detailed description.

DETAILED DESCRIPTION OF THE INVENTION

The present invention is a process for high energy beam welding nickel-base superalloy articles, and particularly single-crystal gamma prime-strengthened nickel-base superalloy castings, without the creation of cracks in the resulting weld joint. The advantages of this invention will generally be described with specific reference to EB welding and the fabrication of superalloy components of gas turbine engines. However, the invention can also be applied to a variety of welded assemblies formed from nickel-base superalloy castings.

In the past, certain superalloy components for gas turbine applications were either fabricated by welding together castings of high-temperature materials other than gamma prime-strengthened nickel-base superalloys, or limited to being assembled with fasteners or by brazing, both of which incur unwanted additional weight. According to the present invention, gamma prime-strengthened nickel-base superalloy castings can be successfully EB welded without the occurrence of cracking during cooling. The benefits of this invention are particularly notable for gamma prime-strengthened nickel-base superalloys containing one or more refractory metals, which at combined levels of about ten weight percent and more render such superalloys particularly prone to centerline and root cracks. A notable example of such a superalloy is René N5, which has a nominal composition, by weight, of about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities.

Figure 2:
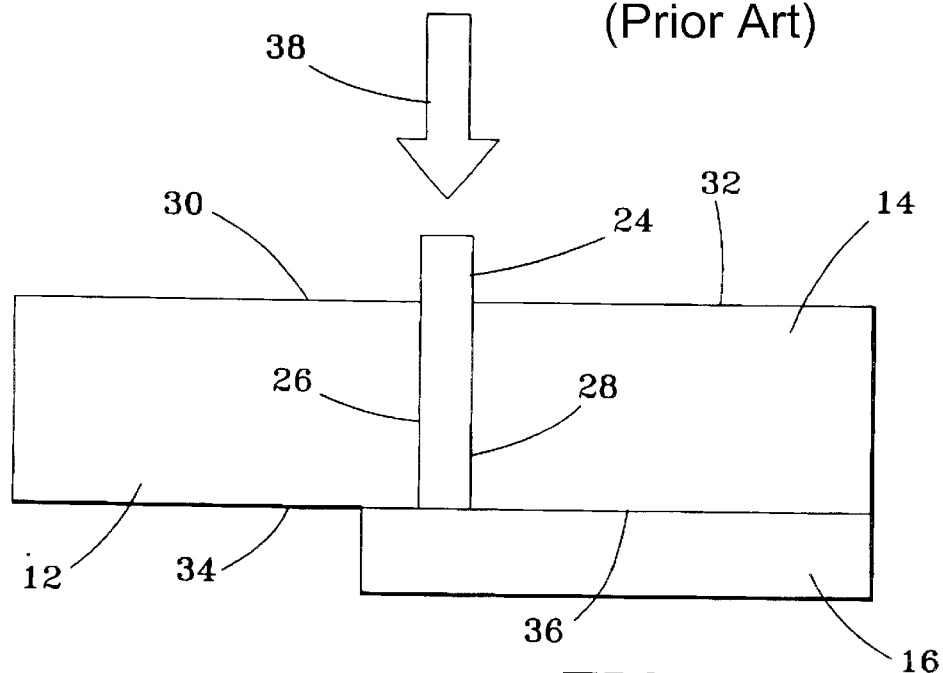
FIGS. 2 and 3 are cross-sectional representations of a process for forming a crack-free weld joint between two single-crystal superalloy components with a superalloy backer in accordance with a preferred embodiment of this invention.

As represented in FIG. 2, the invention makes use of a shim 24 placed between two components 12 and 14 to be welded, so that the shim 24 contacts faying surfaces 26 and 28 of the components 12 and 14. As shown in FIG. 2, the shim 24 protrudes beyond adjacent surfaces 30 and 32 of the components 12 and 14. As may be required for the particular assembly, a backing strip 16 is shown as contacting the lower surfaces 34 and 36 of the components 12 and 14, and bridges the gap filled by the shim 24. The shim 24 is preferably formed of a nickel-base superalloy that is more ductile than the nickel-base superalloys of the components 12 and 14. For example, if the components 12 and 14 are formed of gamma prime-strengthened nickel-base superalloys, the shim 24 may be formed of a nickel-base superalloy that does not contain gamma prime precipitates, an example of which is Inconel 617 with a nominal composition, by weight, of about 22% Cr, 12.5% Co, 9.0% Mo, 1.0% Al, 0.3% Ti, 0.07% C, the balance nickel and incidental impurities.

Figure 3:
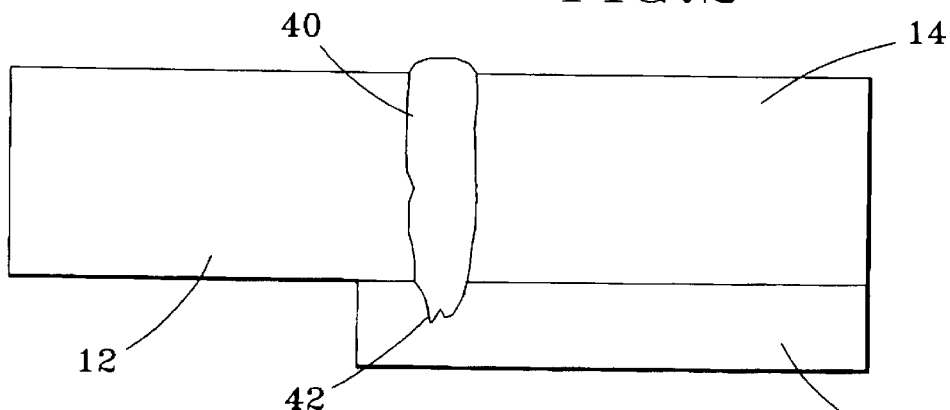

FIG. 3 represents the result of the components 12 and 14 being welded together using an electron beam 38 (FIG. 2). Parameters required for the welding process include operating the electron beam 38 at a low frequency current pulse and a low travel speed. More particularly, the pulsed current frequency is about 10 to 50 Hz, preferably about 10 to about 20 Hz, and the travel speed is about 20 to 35 inches per minute (about 0.85 to about 1.5 cm/s), preferably about 20 to about 25 inches per minute (about 0.85 to about 1.1 cm/s). Other important process parameters include a voltage level of about 100 to about 150 kV, preferably about 100 to about 120 kV, and a current level of about 10 to 40 milliamps, preferably about 20 to about 25 milliamps. The beam 38 may be sharply focused to about 0.006 inch (about 150 micrometers) beyond a sharp focus (i.e., out of focus), and oscillated in a circular pattern with a diameter of about 0.03 to about 0.15 inch (about 0.76 to about 3.8 mm), preferably about 0.070 inch (about 1.8 mm), which together serve to evenly distribute the beam energy across the weld area.

Figure 4:
FIG. 4 is a micrograph of a cross-section through a crack-free weld joint formed between two single-crystal superalloy components in accordance with the preferred embodiment of this invention.

Under the above-stated process conditions, the electron beam 38 causes the shim 24 and portions of the components 12 and 14 contacting the shim 24 to melt, such that the superalloy compositions of the shim 24 and components 12 and 14 mix within the resulting polycrystalline butt weld joint 40 (FIG. 3). As a result of the shim 24 protruding beyond the adjacent surfaces 30 and 32 of the components 12 and 14 (FIG. 2), a positive crown of weld metal is present at the weld surface that eliminates surface defects. A particular characteristic of the welding process of this invention is that, on cooling, the weld joint 40 has a joint root 42 with multiple roots that extend into the backing strip 16. More particularly, the roots 42 extend into the backing strip 16 beneath the original interface between the shim 24 and faying surfaces 26 and 28. In FIG. 3, the joint root 42 is represented as generally having a W-shape. In FIG. 4, which is a microphotograph of a weld joint formed in accordance with this invention, a joint root is seen to have an inverted W-shape as a result of three roots extending into a backing strip. The outer roots extend into the backing strip beneath the original interface between the shim and faying surfaces of the joined bodies (from the vicinity of the existing interfaces between the weld joint and the welded bodies), while the third root extends centrally into the backing strip.

Figure 1:
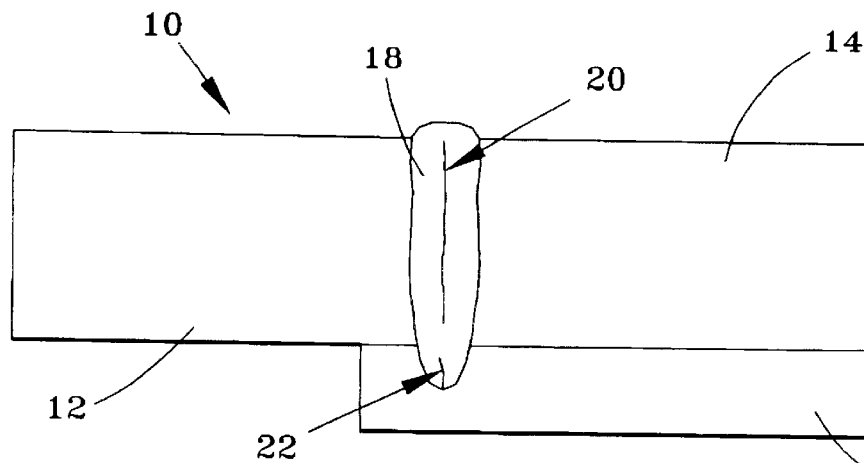
FIG. 1 is a cross-sectional representation of a weld joint of two single-crystal superalloy components with a superalloy backer, and indicates the location of centerline and root cracks in the weld joint.

The present invention has associated W-shaped root joints of the type shown in FIGS. 3 and 4 with the elimination of root cracks (e.g., 22 in FIG. 1), corresponding to improved fatigue life at high temperatures and high strains. While voltage level, current level, beam focus, and beam oscillation are all important parameters of the welding process, the low travel speed of the beam and particularly the low frequency of the current pulse have been directly linked to the ability to produce the W-shaped joint roots desired by this invention. For example, while the voltage, current and travel speed of this invention overlap those of U.S. Patent No. 6,489,583 to Feng et al., the latter process does not produce the W-shaped joint roots of this invention, and therefore does not eliminate root cracks of the type shown in FIG. 1. Furthermore, the Feng et al. welding process did not recognize current pulse frequency as a result-effective variable, i.e., a variable that achieves a recognized result relative to eliminating joint cracks.

The EB welding process of this invention is performed in an atmosphere suitable for prior art EB welding processes. As known in the art, a suitable vacuum level is necessary to prevent electron scattering and rapid oxidation of the EB welding filament. A suitable vacuum level is believed to be about $10^{-4}$ Torr (about 0.013 Pa), though pressures of as high as about $10^{-3}$ Torr (about 0.13 Pa) could be employed with acceptable results. Prior to welding, the components 12 and 14 are preferably preheated to a temperature generally up to the solution heat treatment temperature for the particular superalloy, such as within about 200° C. of the solution temperature. For gamma prime-strengthened superalloys, the preheat temperature is preferably at or near the gamma prime precipitation (solvus) temperature in order to avoid creep while providing stress relief prior to cooling. As known in the art, solution heat treatments for gamma prime-strengthened nickel-base superalloys are performed at temperatures above the superalloy solvus temperature, at which gamma prime precipitates enter solid solution. Gamma prime solvus temperatures for nickel-base superalloys are typically in the range of about 1150° C. to about 1300° C. (about 2100–2370° F.). Rapid quenching from the solution (supersolvus) temperature produces a supersaturated solution, after which aging can be performed to reprecipitate the hardening gamma prime phase in a controlled manner.

While maintaining the above vacuum and temperature conditions, the components 12 and 14 are EB welded to produce the weld joint 40. Particularly suitable welding parameters within the ranges stated above will depend on, among other things, the thicknesses of the components 12 and 14 at the point they are to be joined. In an investigation leading up to this invention, two single-crystal castings formed of René N5 superalloy and a shim formed of IN617 were assembled in the manner represented in FIG. 2. The thicknesses of the castings at the desired weld joint were about 0.3 inch (about 0.76 cm). The shim was about 0.04 inch (about 0.10 cm) thick, had a width of about 0.32 inch (about 0.81 cm), such that it projected about 0.02 inch (about 0.05 cm) above the surfaces of the castings. A backing strip formed of single-crystal René N5 was positioned beneath the shim and castings, and bridged the gap between the castings filled by the shim. The thickness of the backing strip was about 0.15 inch (about 0.38 cm). Using a commercially-available EB weld machine maintained at a vacuum of about $10^{-3}$ Torr (about $7.5 \times 10^{-6}$ Pa) and a temperature of about 25° C.), an out-of-focus electron beam was projected onto the shim and the immediately surrounding regions of the castings. The welding parameters included a voltage level of about 120 kV, a current level of about 24 milliamps, a pulsed current frequency of about 10 Hz, and a travel speed of about 20 inches per minute (about 0.85 cm/s). During welding, strong mixing and stirring between the casting and shim materials took place. The welded assembly was then cooled to room temperature and heat treated under conditions appropriate for René N5. The resulting weld metal composition is summarized by weight in Table 1 below.

TABLE 1

| Element | Weld Center | IN617 (shim) | René N5 (castings) |
|---------|-------------|--------------|--------------------|
| Al | 4.05 | 1 | 6.2 |
| Mo | 2.76 | 9 | 1.5 |
| Cr | 14.02 | 22 | 7 |
| Co | 9.33 | 12 | 7.5 |
| Ti | 0.01 | 0.3 | — |
| Ta | 4.46 | — | 6.5 |
| S | 0.00 | — | — |
| Fe | 0.05 | — | — |
| W | 3.39 | — | 5 |
| Re | 2.18 | — | 3 |
| Hf | — | — | 0.15 |
| C | — | 0.07 | 0.05 |
| B | — | — | 0.004 |
| Y | — | — | 0.01 |
| Ni | Balance | Balance | Balance |

As a result of the EB welding technique of this invention, the welded castings and weldment were essentially free of thermally-induced cracks after cooling and remained crack-free after heat treating. Particularly notable as being absent were centerline cracks in the weld and root cracks in the backing strip. While not wishing to be held to any particular theory, from the results of this investigation it was concluded that root cracks occur in backing strips formed of single-crystal superalloys as a result of the electron beam striking the backing strip, and that the combination of a low current pulse frequency and low travel speed produced a W-shaped joint root (FIGS. 3 and 4) that was linked through the investigation to a reduced risk of root cracks, possibly as a result of better distributed stresses in the backing strip. The strong mixing and stirring that occurred during welding between the casting and shim materials were believed to inhibit centerline cracking in the weld joint.

From Table 1, it can be seen that the weld metal has become a gamma prime precipitation-hardening alloy with the composition similar to that of Inconel 738 (nominal composition, by weight, of 16% chromium, 8.5% cobalt, 1.75% molybdenum, 2.6% tungsten, 1.75% tantalum, 0.9% niobium, 3.4% aluminum, 3.4% titanium, 0.10% zirconium, 0.01% boron, 0.17% carbon, the balance nickel and impurities). The presence of the gamma prime precipitates (principally Ni$_3$(Al,Ta)) ensures adequate creep strength and low cycles fatigue (LCF) life for the joint at high temperatures. Subsequent LCF testing performed at a strain level of about 0.7% showed that the LCF life of the joints welded in accordance with the present invention was about four times longer than that of weld joints formed on identical hardware by TIG welding processes.

In view of the above, it can be seen that the present invention enables EB welding of gamma prime-strengthened single-crystal nickel-base superalloy articles without resulting in stress-induced cracks upon cooling. While particularly directed to EB welding, it is believed that the advantages of this invention can also be realized with laserwelding techniques. A notable limitation of laser welding is the limited depth of penetration of the weld, which restricts the structural applications for laser welded assemblies.

While the invention has been described in terms of a preferred embodiment, it is apparent that other forms could be adopted by one skilled in the art. Accordingly, the scope of the invention is to be limited only by the following claims.

What is claimed is:

1. A method of high-energy beam welding at least two single-crystal superalloy articles, the method comprising the steps of:

placing a shim in a gap between the articles so that the shim contacts faying surfaces of the articles, the shim being formed of a superalloy that is more ductile than the superalloys of the articles;

welding the articles together with a high-energy beam operated at a pulsed current frequency of about 10 to 50 Hz, a travel speed of about 0.85 to about 1.5 cm/s, a voltage level of about 100 to about 150 kV, and a current level of about 10 to 40 milliamps, the high-energy beam melting the shim and portions of the articles contacting the shim to cause mixing of the superalloys of the shim and articles; and then cooling the articles to yield a weld joint having a W-shaped joint root.

2. A method according to claim 1, wherein the superalloys of the articles are nickel-base superalloys containing at least ten weight percent of one or more refractory metals.

3. A method according to claim 1, wherein the superalloys of the articles are strengthened by gamma-prime precipitates.

4. A method according to claim 3, wherein the superalloy of the shim does not contain gamma-prime precipitates, and the weld joint contains gamma-prime precipitates.

5. A method according to claim 1, wherein the shim protrudes beyond adjacent surfaces of the articles.

6. A method according to claim 1, further comprising providing a backing strip that contacts the articles and bridges the gap between the articles, the W-shaped joint root being formed within the backing strip.

7. A method according to claim 6, wherein the backing strip has a single-crystal microstructure.

8. A method according to claim 1, wherein the superalloys of the articles have a nominal composition, by weight, of about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities.

9. A method according to claim 1, wherein the superalloy of the shim has a nominal composition, by weight, of about 22% Cr, 12.5% Co, 9.0% Mo, 1.0% Al, 0.3% Ti, 0.07% C, the balance nickel and incidental impurities.

10. A method according to claim 1, wherein the weld joint is a butt weld.

11. A method according to claim 1, wherein the high-energy beam is sharply focused to about 150 micrometers beyond a sharp focus.

12. A method according to claim 1, wherein the high-energy beam is oscillated in a circular pattern with a diameter of about 0.76 to about 0.38 mm.

13. A method according to claim 1, wherein the articles when joined form a component of a gas turbine engine.

14. A method of forming a component of a gas turbine engine by electron beam welding at least two articles formed of gamma prime-strengthened single-crystal nickel-base superalloys containing at least ten weight percent of one or more refractory metals, the method comprising the steps of:

providing a shim formed of a nickel-base superalloy that does not contain gamma-prime precipitates and is more ductile than the nickel-base superalloys of the articles, the shim having a thickness of about 0.5 to 2.5 mm;

placing the shim in a gap between the articles so that the shim contacts faying surfaces of the articles and protrudes beyond adjacent outer surfaces of the articles, and placing a single-crystal superalloy backing strip that contacts surfaces of the articles opposite the outer surfaces thereof so that the backing strip bridges the gap between the articles;

welding the articles together with an electron beam operated at a current pulse frequency of about 10 to about 50 Hz, a travel speed of about 0.85 to about 1.5 cm/s, a voltage level of about 100 to about 150 kV, and a current level of about 10 to 40 milliamps, the electron beam melting the shim and portions of the articles contacting the shim to cause mixing of the superalloys of the shim and articles; and then cooling the articles to yield a butt weld joint containing gamma-prime precipitates and having a W-shaped joint root that extends into the backing strip.

15. A method according to claim 14, wherein the electron beam is operated at a pulsed current frequency of about 10 to about 20 Hz, a travel speed of about 0.85 to about 1.1 cm/s, a voltage level of about 100 to about 120 kV, and a current level of about 20 to about 25 milliamps, the articles having single-crystal microstructures.

16. A method according to claim 14, wherein the superalloys of the articles have a nominal composition, by weight, of about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities.

17. A method according to claim 16, wherein the superalloy of the shim has a nominal composition, by weight, of about 22% Cr, 12.5% Co, 9.0% Mo, 1.0% Al, 0.3% Ti, 0.07% C, the balance nickel and incidental impurities.

18. A method according to claim 17, wherein the butt weld joint has a nominal composition, by weight, of about 14% Cr, 9% Co, 3% Mo, 4% Al, 4% Ta, 3% W, 2% Re, the balance nickel and low level impurities.

19. A method according to claim 14, wherein the joint root comprises first and second roots that extend into the backing strip beneath interfaces that existed between the shim and faying surfaces prior to the welding step.

20. A method according to claim 19, wherein the joint root further comprises a third root extending into the backing strip between the first and second roots.

21. An assembly formed by high-energy beam welding at least two single-crystal superalloy articles, the articles being welded together at a weld joint having a W-shaped joint root.

22. An assembly according to claim 21, wherein the superalloys of the articles are nickel-base superalloys containing at least ten weight percent of one or more refractory metals.

23. An assembly according to claim 21, wherein the superalloys of the articles are strengthened by gamma-prime precipitates.

24. An assembly according to claim 21, wherein the weld joint contains gamma-prime precipitates.

25. An assembly according to claim 21, further comprising a backing strip that contacts the articles and bridges the weld joint between the articles, the W-shaped joint root being formed within the backing strip.

26. An assembly according to claim 25, wherein the backing strip has a single-crystal microstructure.

27. An assembly according to claim 21, wherein the superalloys of the articles have a nominal composition, by weight, of about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities.

28. An assembly according to claim 21, wherein the weld joint is a butt weld.

29. An assembly according to claim 21, wherein the assembly is a component of a gas turbine engine.

30. A component of a gas turbine engine comprising:

at least two articles formed of gamma prime-strengthened single-crystal nickel-base superalloys containing at least ten weight percent of one or more refractory metals, the articles being joined together by a butt weld joint containing gamma-prime precipitates; and a single-crystal superalloy backing strip that contacts adjacent surfaces of the articles and bridges the weld joint between the articles, the weld joint having a W-shaped joint root that extends into the backing strip.

31. A component according to claim 30, wherein the superalloys of the articles have a nominal composition, by weight, of about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities.

32. A component according to claim 30, wherein the superalloy of the backing strip has a nominal composition, by weight, of about 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel and incidental impurities.

33. A component according to claim 30, wherein the weld joint has a nominal composition, by weight, of about 14% Cr, 9% Co, 3% Mo, 4% Al, 4% Ta, 3% W, 2% Re, the balance nickel and low level impurities.

34. A component according to claim 30, wherein the joint root comprises first and second roots that extend into the backing strip near interfaces between the weld joint and the articles.

35. A component according to claim 34, wherein the joint root further comprises a third root extending into the backing strip between the first and second roots.

* * * * *